US008740230B2

(12) United States Patent
Grossman

(10) Patent No.: US 8,740,230 B2
(45) Date of Patent: *Jun. 3, 2014

(54) USER-PROPELLED VEHICLE HAVING A CHANNEL TO RECEIVE AN ILLUMINATABLE MEANS

(75) Inventor: Martin Grossman, Giffnock (GB)

(73) Assignee: H. Grossman Limited, Glasgow (GB)

( * ) Notice: Subject to any disclaimer, the term of this patent is extended or adjusted under 35 U.S.C. 154(b) by 160 days.

This patent is subject to a terminal disclaimer.

(21) Appl. No.: 12/703,810

(22) Filed: Feb. 11, 2010

(65) Prior Publication Data
US 2010/0140894 A1 Jun. 10, 2010

Related U.S. Application Data

(63) Continuation of application No. 11/122,529, filed on May 5, 2005, now Pat. No. 7,712,937.

(30) Foreign Application Priority Data

May 5, 2004 (GB) .................................. 04 09 974.3

(51) Int. Cl.
*B62M 1/00* (2010.01)
*F21S 4/00* (2006.01)
(52) U.S. Cl.
USPC ..................................... 280/87.041; 362/545
(58) Field of Classification Search
USPC ............... 280/87.021, 87.041, 87.042, 87.05; 362/473, 543, 544, 545
See application file for complete search history.

(56) References Cited

U.S. PATENT DOCUMENTS

| 4,179,133 | A | * | 12/1979 | Robb ....................... 280/87.041 |
| 4,544,993 | A | | 10/1985 | Kirk |
| 4,597,033 | A | * | 6/1986 | Meggs et al. .................. 362/183 |
| 4,707,884 | A | * | 11/1987 | Chang ............................. 16/440 |
| 4,991,066 | A | | 2/1991 | McCowan |
| 4,997,196 | A | | 3/1991 | Wood |
| 5,132,883 | A | | 7/1992 | La Lumandier |
| 5,513,080 | A | | 4/1996 | Magle et al. |
| 5,588,734 | A | | 12/1996 | Talamo et al. |
| 6,123,443 | A | | 9/2000 | Conway |
| 6,199,880 | B1 | | 3/2001 | Favorito et al. |
| 6,203,037 | B1 | * | 3/2001 | Wilson et al. ............ 280/87.042 |
| 6,260,866 | B1 | | 7/2001 | Cheng |

(Continued)

FOREIGN PATENT DOCUMENTS

| DE | 201 01 316 U1 | 5/2001 |
| DE | 201 07 388 U1 | 8/2001 |

(Continued)

OTHER PUBLICATIONS http://www.razor.com, (7 pgs.)—kick scooters, dated Apr. 4, 2008.

*Primary Examiner* — Frank Vanaman
(74) *Attorney, Agent, or Firm* — Tarolli, Sundheim, Covell & Tummino LLP

(57) ABSTRACT

A vehicle has a footboard 116 with side edge channels 130, each housing a rod or tube 112 forming illumination. The rods or tubes are connected to power means that include a battery or dynamo. Each rod or tube can include a transparent or translucent polymeric sheath for a series of LEDs. A switch provides on/off control and can provide different modes of illumination of the LEDs. The vehicle can be a foldable micro-scooter.

29 Claims, 6 Drawing Sheets

(56) References Cited

U.S. PATENT DOCUMENTS

| | | | |
|---|---|---|---|
| 6,273,440 B1 * | 8/2001 | Wilson | 280/87.042 |
| 6,382,366 B1 * | 5/2002 | Chang | 188/29 |
| 6,435,529 B1 * | 8/2002 | Stewart et al. | 280/87.041 |
| 6,646,547 B2 | 11/2003 | Chiu | |
| 7,048,284 B1 | 5/2006 | Seifert | |
| 2002/0000339 A1 | 1/2002 | Tsai | |
| 2002/0030339 A1 | 3/2002 | Powers | |
| 2002/0105158 A1 | 8/2002 | Stewart et al. | |
| 2002/0135464 A1 | 9/2002 | Chiu | |
| 2002/0135998 A1 | 9/2002 | Chiu | |
| 2003/0007352 A1 | 1/2003 | Ter-Hovhannisian | |
| 2005/0029767 A1 | 2/2005 | Chang | |
| 2006/0083012 A1 | 4/2006 | Ter-Hovhannissian | |

FOREIGN PATENT DOCUMENTS

| | | |
|---|---|---|
| DE | 200 18 683 U1 | 9/2001 |
| DE | 203 02 674 U1 | 7/2003 |
| DE | 203 11 097 U1 | 2/2004 |
| EP | 1 174 335 A2 | 1/2002 |
| GB | 2 360 984 A | 10/2001 |
| GB | 2 381 503 A | 5/2003 |
| GB | 2 397 808 A | 8/2004 |
| JP | 2003-265673 A | 9/2003 |
| WO | WO 1998/046474 A2 | 10/1998 |

* cited by examiner

USER-PROPELLED VEHICLE HAVING A CHANNEL TO RECEIVE AN ILLUMINATABLE MEANS

CROSS-REFERENCES TO RELATED APPLICATIONS

This application is a Continuation of U.S. patent application Ser. No. 11/122,529, filed May 5, 2005 issued as U.S. Pat. No. 7,712,937 which claims priority from British Application No. GB0409974.3, filed May 5, 2004. The present application claims priority to the aforementioned patent applications, which are incorporated in their entirety herein by reference for all purposes.

FIELD OF INVENTION

The present invention relates to an improved scooter or similar type self/foot-propelled transport means. The invention particularly, though not exclusively, relates to a scooter or the like incorporating a novelty illumination or lighting effect.

BACKGROUND OF INVENTION

Scooters have undergone an upsurge in popularity in recent years because of innovations, such as folding scooters and micro-scooters.

It is an object of at least one embodiment of at least one aspect of the present invention to provide an improved scooter incorporating a novelty lighting effect.

SUMMARY OF INVENTION

According to a first aspect of the present invention there is provided a scooter or other self or foot propelled vehicle or the like having at least one illuminatable means or medium.

Provision of the at least one illuminatable means or medium on a scooter or any user-propelled vehicle, will, when illuminated, make the scooter or user-propelled vehicle more visible to onlookers and passers by. Making a scooter more visible can assist in avoiding and/or reducing accidents involving scooters, and/or can provide an additional visual effect such as a novelty visual effect, e.g. when the rider is performing stunts or manoeuvres.

Preferably, the scooter has a platform or deck for supporting, e.g. a foot or feet of a user.

The at least one illuminatable means may be coupled to the platform.

Preferably, the platform has at least one longitudinal edge and the at least one illuminatable means is provided on or adjacent to the platform along at least a portion of the at least one longitudinal edge.

Having at least one illuminatable means provided on or adjacent to at least one longitudinal edge of the platform permits an illuminatable means of a length suitable for seeking to maximise the visual effect created to be used.

Preferably, the platform has first and second substantially parallel longitudinal edges, and the scooter provides first and second illuminatable means on or adjacent each respective longitudinal edge.

Having the illuminatable means on or adjacent to the longitudinal or side edges of the platform permits the visual effect to be viewed or noticed by onlookers or passers-by on either side of the scooter.

Preferably, there are provided means for coupling the at least one illuminatable means to the platform.

Preferably, the or each at least one longitudinal edge has at least one channel, the or each at least one channel being adapted to receive a respective at least one illuminatable means. Alternatively, at least one channel is provided or mounted adjacent an/each at least one longitudinal edge, the/each at least one channel being adapted to receive a respective at least one illuminatable means.

Preferably, the or each channel has a generally "C" cross-section.

A channel, particularly a "C" channel, provides a secure housing for an illuminatable means, at least partially protecting the illuminatable means from damaging impacts whilst not significantly decreasing the overall illumination effect.

Preferably, the at least one illuminatable means can be releasably mounted in the channel.

Releasably mounting the illuminatable means in the channel may permit the illuminatable means to be replaced if it fails, and may permit the user to change the illuminatable means if a different visual effect is desired or required.

Preferably, the platform is an extruded metal platform.

Using extrusion to manufacture the metal platform allows the platform, including the channel or channels, to be manufactured as a unitary component, thereby potentially increasing the strength of the platform and reducing the cost of manufacture of the platform, when compared to a platform made from a number of component parts.

Preferably, the metal is substantially aluminium or an alloy thereof.

Aluminium is a strong, low cost and low weight metal, which is particularly suited for this application.

Preferably, the at least one illuminatable means comprises an illuminatable rod or tube.

The illuminatable rod or tube may be at least part transparent or translucent.

Preferably, the illuminatable rod or tube comprises a polymeric sheath enclosing or encapsulating a plurality of electrically connected illumination devices, e.g. light emitting diodes (LEDs).

The illuminatable rod or tube may be made substantially from polyinylchloride (PVC), e.g. PVC resin, plasticiser, stabliser and toner.

The illuminatable rod or tube may comprise a hollow tube containing the illumination devices or a solid rod encapsulating the illumination devices.

LEDs are preferred as LEDs use relatively low levels of power whilst providing a desired visual effect. A polymeric sheath is preferred as protection for the LEDs due to polymer's robust shatter resistant qualities.

Preferably, the scooter includes control means for the user to select a desired operation mode of the illuminatable means. It is preferred that alternative visual effects can be selected and controlled by the user.

Preferably, the control means comprises switch means. The control means may be programmed to operate in a number of modes such as off and on and optionally continuous, flashing, strobing etc.

Preferably, the illuminatable means is powered by one or more batteries. Alternatively, the scooter includes a power generator such as a dynamo for powering the illuminatable means. A dynamo is an electro-magnetic power generator that converts rotational mechanical energy to AC power.

Most preferably, the scooter is a collapsible micro-scooter.

According to a second aspect of the present invention there is provided a platform or deck for supporting a user on a scooter or the like, the platform including a footplate and at least one channel portion adapted to receive an illuminated means.

Preferably, the platform is manufactured as a unitary component.

Preferably, the platform is an extruded metal platform.

Preferably, the metal is substantially aluminium or an alloy thereof.

Preferably, the platform has two substantially parallel channel portions.

Preferably, the at least one channel portion has a generally "C" cross-section.

Preferably, the platform is a platform for a microscooter or collapsible micro-scooter.

According to a third aspect of the present invention there is provided a method of manufacturing a platform for a scooter, the platform comprising a footplate, and at least one channel portion adapted to receive an illuminatable means, the method comprising the step of:

extruding the platform as a unitary component.

Preferably, the platform is extruded from metal. Preferably, the metal is substantially aluminium or an alloy thereof.

According to a further aspect of the present invention there is provided a scooter or other self or foot propelled vehicle including a platform or deck for supporting a foot or feet of a user, the platform having at least one longitudinal edge, at least one illuminatable means, and at least one channel provided on or mounted adjacent to at least a portion of the at least one longitudinal edge, the at least one channel being configured to receive and entrap or retain, optionally releasably, the at least one illuminatable means.

The at least one illuminatable means may comprise an elongate member providing a plurality of illumination devices, and the at least one channel may comprise an elongate channel.

A height or width of an inner portion of the at least one channel may be greater than a height or width of an opening of the at least one channel, and a height or width of the at least one illuminatable means may be greater than the height or width of the opening of the at least one channel. The illuminatable means may be visible through the opening, which opening may comprise a longitudinally extending opening.

The platform may have first and second substantially parallel longitudinal edges, first and second channels provided on or mounted adjacent to at least a portion of each respective longitudinal edge, and first and second illuminatable means received within and entrapped or retained by the respective first and second channels.

The or each channel may have a generally "C"-shaped cross-section.

The at least one illuminatable means may be releasably retained in the at least one channel.

The platform may be an extruded metal platform. The metal may be substantially aluminium or an alloy thereof. The at least one illuminatable means may comprise an illuminatable rod or tube.

The illuminatable rod or tube may be at least part transparent or translucent.

The illuminatable rod or tube may comprise a polymeric sheath enclosing or encapsulating a plurality of electrically connected illumination devices such as light emitting diodes (LEDs).

The illuminatable rod or tube may be made substantially from polyvinylchloride (PVC).

The illuminatable rod or tube may comprise a hollow tube containing the illumination devices or a solid rod encapsulating the illumination devices.

The scooter may include control means for the user to select a desired operation mode of the illuminatable means.

The control means may comprise switch means.

The control means may be programmed to operate in a number of modes selected from: off and on, and optionally one or more of continuous, flashing, strobing.

The illuminatable means may be powered by one or more batteries.

The scooter may include a power generator such as a dynamo for powering the illuminatable means.

The scooter or other self propelled vehicle may be a scooter, most preferably a micro-scooter or collapsible micro-scooter.

The at least one illuminatable means may be received within the at least one channel either from an end of the at least one channel or by snapping the at least one illuminatable means into the at least one channel.

According to a yet further aspect of the present invention there is provided a platform or deck for supporting a user on a scooter or the like, the platform including a footplate, and at least one channel portion configured to receive and entrap an illuminatable means.

The platform may be manufactured as a unitary component.

The platform may be an extruded metal platform.

The metal may be substantially aluminium or an alloy thereof.

The platform may have two substantially parallel channel portions, e.g. formed on opposing side edges thereof.

The channel portions may have a generally "C" cross-section.

The platform may be a platform for a micro-scooter or collapsible micro-scooter.

According to a still further aspect of the present invention there is provided a method of manufacturing a platform for a scooter, the platform including a footplate and at least one channel portion adapted to receive and entrap an illuminatable means, the method including the step of extruding the platform as a unitary component.

The platform may be extruded from metal substantially comprising aluminium or an alloy thereof.

BRIEF DESCRIPTION OF DRAWINGS

Embodiments of the present invention will now be described by way of example only, and with reference to the accompanying drawings, which are:

FIG. 3 a cut away cross-sectional view through a platform of the scooter of FIG. 2a;

DETAILED DESCRIPTION OF DRAWINGS

Figure 1:
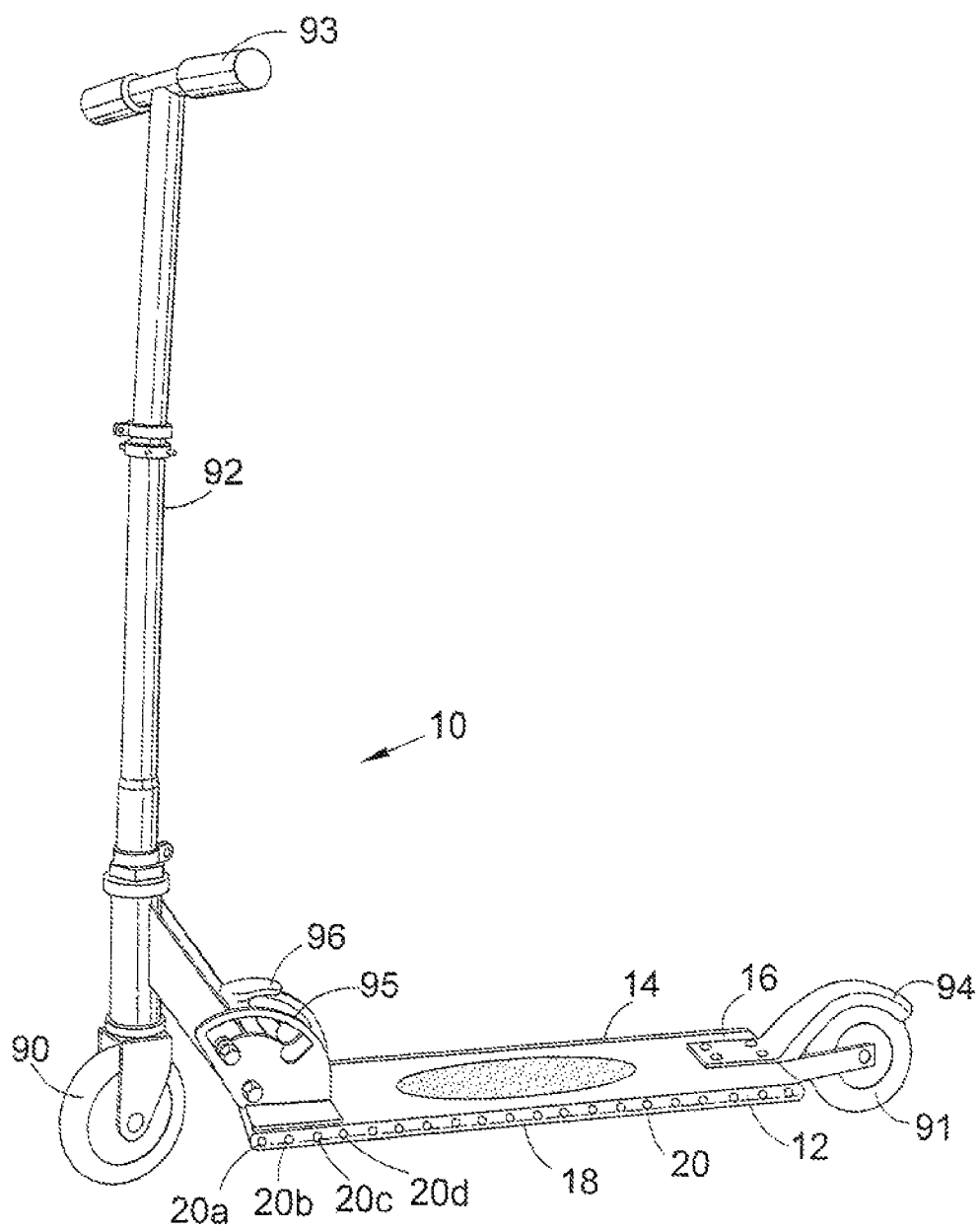
FIG. 1 a perspective view of a scooter according to a first embodiment of the present invention in an operational state.

Referring initially to FIG. 1 there is shown a perspective view of a scooter generally designated 10 according to a first embodiment of the present invention. The scooter 10 includes a first illuminatable means or tube 12 and a second illuminatable means or tube 14. The first and second illuminatable tubes 12, 14 are coupled to a platform or deck 16. The first illuminatable tube 12 comprises a polymeric sheath 18 and a plurality of light emitting diodes (LEDs) 20. In this embodiment there are provided twenty LEDs 20. The first four 20a-20d are indicated. The second illuminatable tube 14 is similar to the first illuminatable tube 12.

The scooter 10 also includes first and second wheels 90, 91, steering column 92, handle bars 93 and brake 94 as well as hingable locking mechanism 95 including lever 96.

Figure 2A:
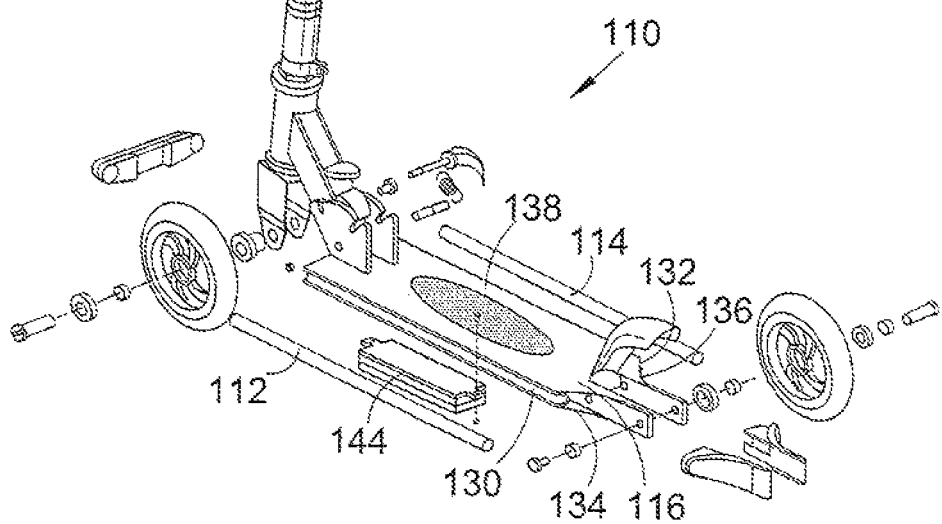
FIG. 2a an exploded perspective view of a scooter according to a second embodiment of the present invention in an operational state.

Referring now to FIG. 2a there is shown an exploded perspective view of a scooter 110 including first and second illuminatable means or tubes 112, 114 according to a second embodiment of the present invention. Parts of scooter 110 are indicated by the same number as like parts of scooter 10 but increased by '100'.

The scooter 110 includes first illuminatable tube 112 and second illuminatable tube 114. The first and second illuminatable tubes 112, 114 are coupled to a platform 116 by placing them into "C" section channels 130, 132 formed along the edges 134, 136 of the platform 116 which provides footplate 138, e.g. by inserting the tubes 112, 114 from an edge of the respective channel 130, 132 or by "snapping" the tubes 112, 114 into the respective channel 130, 132. In this embodiment, as in the first embodiment, the platform 116 has been manufactured as a single component by extruding footplate 139 and the "C" section channels 130, 132 in one piece. Alternatively the "C" section channels 130, 132 can be mounted to the edges 134, 136 of the platform 116 which provides footplate 138 using screws, rivets or any other suitable fixing means.

Also shown in FIG. 2a is control box 144 which contains a control system (not shown) and batteries (not shown) for the illuminated tubes 112, 144. The control box 144 is mounted on an underside of the footplate 138.

Figure 2B:
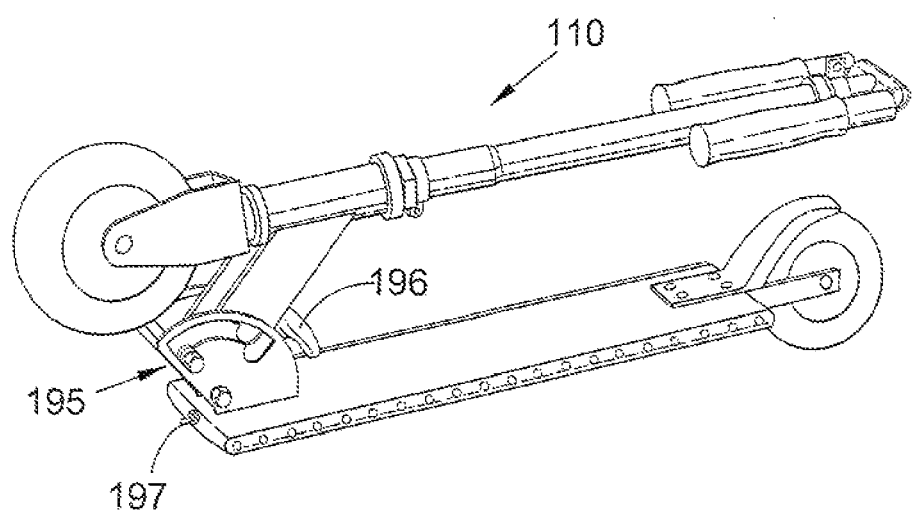
FIG. 2b a perspective view of the scooter of FIG. 2a in a collapsed state.

Referring to FIG. 2b it can be seen that the scooter 110 is erectably collapsible via a hingable locking mechanism, generally designated 195, and including a lever 196 as is generally known in the art.

The scooter 110 also provides a switch means 197 mounted at one end of the platform 116. The switch 197 controls the operation of the illuminatable means 112, 114 and selection of the lighting configuration or mode, for which see the description for the third embodiment hereafter.

Figure 3:
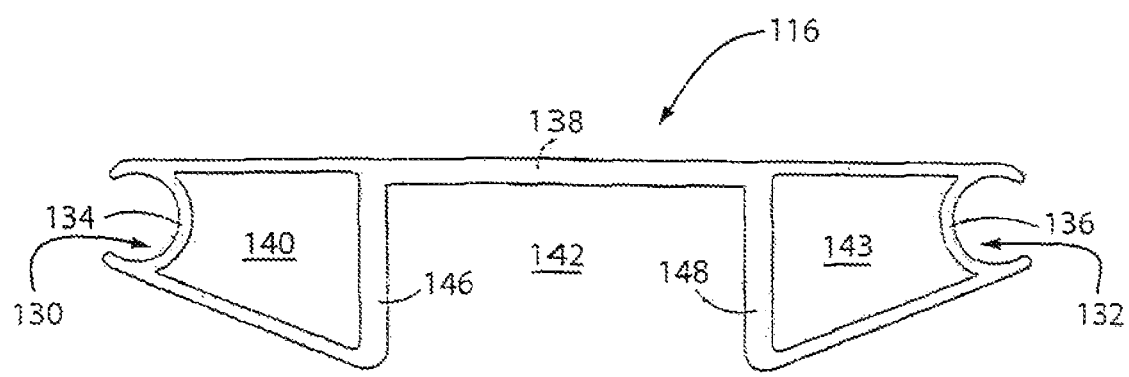

Referring now to FIG. 3 there is shown a cut away cross-sectional view through the platform of the scooter 110 of FIG. 2a. As can be seen the platform 116 has been extruded as a single component and comprises a footplate 138 with edges 134, 136 defining "C" channels 130, 132. The platform 116 has been designed to be a low weight component and accordingly includes two voids 140, 143 to minimise material usage and therefore weight.

The control box 144 (shown in FIG. 2a) fits into the space 142 between the voids 140, 143. Once in position the control box 144 is protected by walls 146, 148 of void 142.

Figure 4:
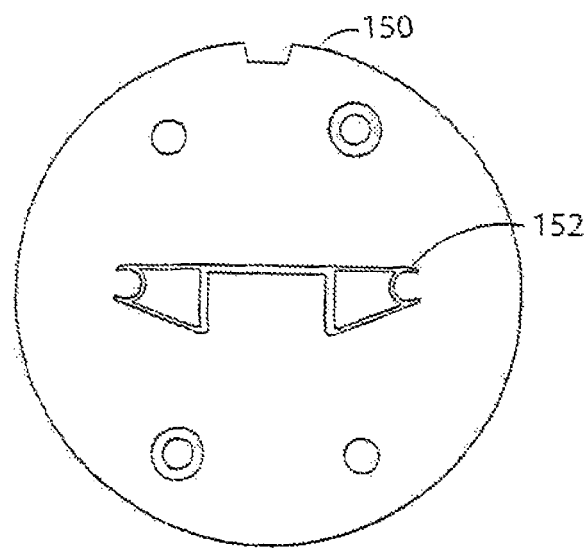
FIG. 4 a plan view of a tool used for extrusion of the platform of FIG. 3.

FIG. 4 shows a plan view of a tool used for the extrusion of the platform of FIG. 3. The tool 150 includes aperture 152 through which aluminium is extruded to form platform 116.

Figure 5:
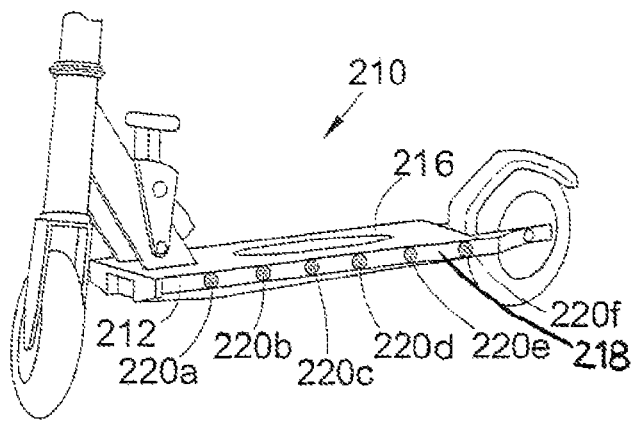
FIG. 5 a perspective view of part of a scooter according to a third embodiment of the present invention in a first lighting configuration.

Referring now to FIG. 5 there is shown a perspective view of part of a scooter 210 according to a third embodiment of the present invention. Parts of the scooter 210 are indicated by the same number as like parts of scooter 10 but increased by '200'.

The scooter 210 includes a first illuminatable tube 212 and a second illuminatable tube (not shown). The first (and second) illuminatable tube 212 is coupled to a platform 216, and includes an at least part transparent or translucent polymeric sheath 218, and a plurality of light emitting diodes (LEDs) 220a-220f. In this embodiment 6 LEDs 220a-220f are provided. In FIG. 5 the LEDs 220a-220f are shown in a first lighting configuration, in which none of the diodes 220a-220f are illuminated.

Figure 6:
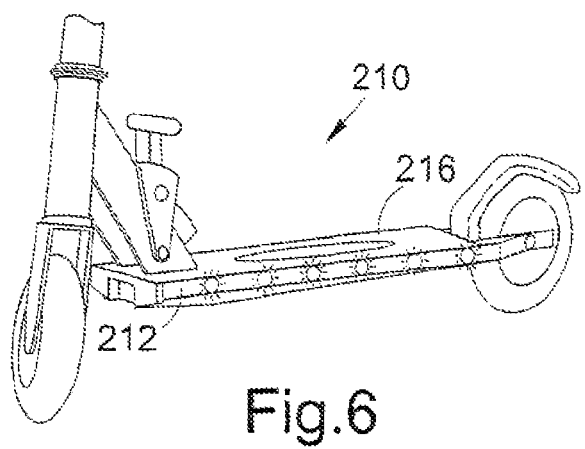
FIG. 6 a perspective view of part of the scooter of FIG. 5 in a second lighting configuration.

FIG. 6 shows the scooter 210 of FIG. 5 in a second lighting configuration, in which all the diodes 220a-220f are illuminated (for clarity the reference numerals 220a-220f are included only on FIG. 5). If the user desires the control box (not shown) is programmed to alternate between these two, first and second, configurations to provide a flashing effect.

Figure 7A:
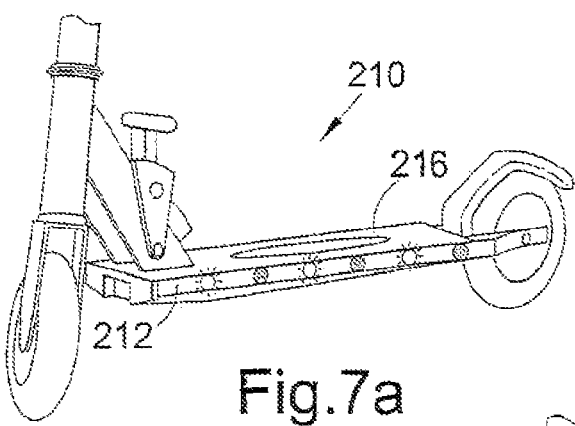
FIGS. 7a-b perspective views of part of the scooter of FIG. 5 in a third lighting configuration.
Figure 7B:
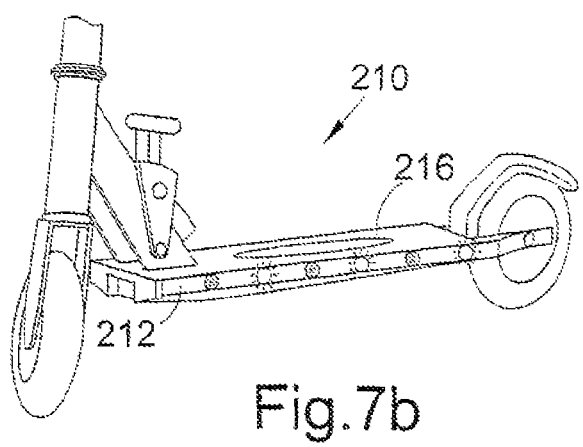

FIGS. 7a and 7b show the scooter 210 of FIG. 5 in a third lighting configuration. In FIG. 7a the first, third and fifth diodes 220a, 220c and 220e are illuminated and the second, fourth and sixth diodes 220b, 220d and 220f are not. In FIG. 7b the reverse state is shown, i.e. the second, fourth and sixth diodes 220b, 220d and 220f are illuminated and the first, third and fifth diodes 220a, 220c and 220e are not. Alternation between these two states will result in a pattern in which three single illuminated spots or dots appear to be moving from one end of the illuminated tube 212 to the other.

FIGS. 8a to 8d show the scooter 210 of FIG. 5 in a fourth lighting configuration.

Figure 8A:
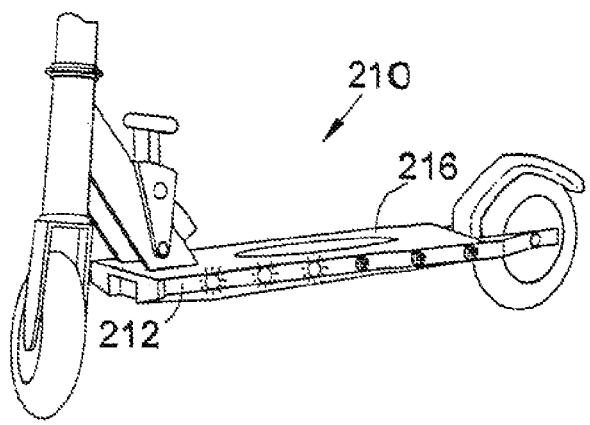
FIGS. 8a-d perspective views of part of the scooter of FIG. 5 in a fourth lighting configuration.

In FIG. 8a, the first, second and third diodes 220a, 220b and 220c are illuminated and the fourth, fifth and sixth diodes 220d, 220e and 220f are not.

Figure 8B:
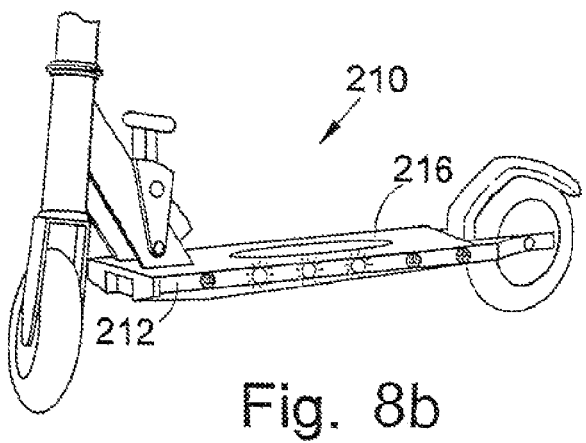

In FIG. 8b, the second, third and fourth diodes 220b, 220c and 220d are illuminated and the first, fifth, and sixth diodes 220a, 220e and 220f are not.

Figure 8C:
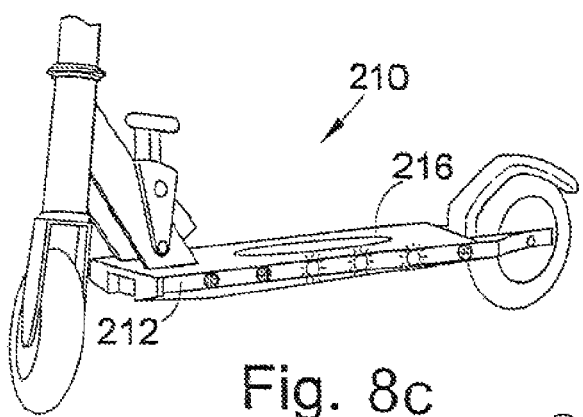

In FIG. 8c, the third, fourth and fifth diodes 220c, 220d and 220e are illuminated and the first, second and sixth diodes 220a, 220b and 220f are not.

Figure 8D:
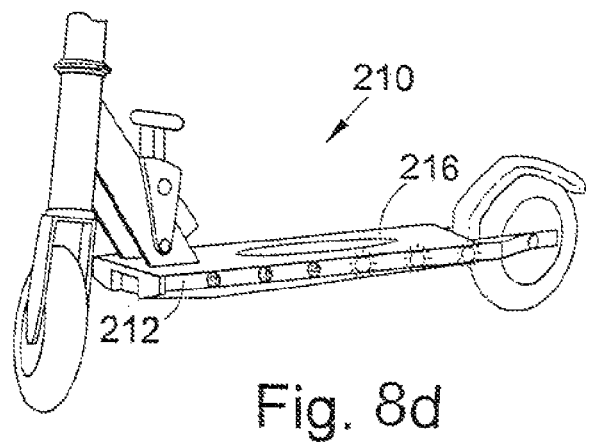

In FIG. 8d, the fourth, fifth and sixth diodes 220d, 220e and 220f are illuminated and the first, second and third diodes 220a, 220b and 220c are not.

Repeatedly sequencing through the four stages of the fourth configuration would give a viewer the impression that three lights are moving together from one end of the illuminated tube 212 to the other.

It will be understood that the foregoing embodiments of the present invention are given for illustrative purposes only, and that various modifications and improvements may be made to the scooters described herein without departing from the scope of the invention.

For example although the lighting configurations discussed in FIGS. 5 to 8d use a six LED lighting tube, any number of LEDs could be used to create different lighting effects such as lights converging on the middle from each end, or diverging from the middle to each end.

Similarly the lights can be any colour, or could be a combination of different colours.

It will be appreciated that the exemplified embodiments of the scooters hereinbefore described are collapsible "micro-scooters". However, it will be appreciated that the novel lighting effect provided by the illuminatable means may be provided on other types of scooters, skateboards or other foot-propelled vehicles having a platform or deck and two or more wheels.

It will also be appreciated that the disclosed embodiments all include the feature of claim 1, but may be modified to include one or more of the features given in the "Summary of Invention" in any combination.

The invention claimed is:
1. A scooter comprising:
at least one front wheel, at least one rear wheel, a steering column and handlebars,
a metal platform for supporting a foot or feet of a user, the platform having an upperside and an underside;
at least one illuminatable means;
first and second longitudinal edges, first and second channels each associated with at least a portion of a respective longitudinal edge, at least one of first and second channels being configured to receive and entrap the at least one illuminatable means, and
first and second walls depending from the underside of the platform away from the upperside of the platform so as to define a space between the walls, the first wall defining a void and the second wall defining a further void, each void having a length that is substantially equal to the length of the space, wherein the first wall comprises a first portion that extends from the underside of the platform and a second portion that extends at an angle between the first portion and the first channel and is spaced from the underside of the platform, wherein the second wall comprises a first portion that extends from the underside of the platform and a second portion that extends at an angle between the first portion of the second wall and the second channel and is spaced from the underside of the platform,
wherein the at least one illuminatable means comprises an elongate member providing a plurality of illumination devices therein, and the first and second channels comprises an elongate channel, and
wherein a height or width of an inner portion of at least one of first and second channels is greater than a height or width of an opening of the at least one of first and second channels, and a height or width of the at least one illuminatable means is greater than the height or width of the opening of the at least one of first and second channels.

2. A scooter as claimed in claim 1, wherein the platform has first and second substantially parallel longitudinal edges, the first and second channels being provided on or mounted adjacent to at least a portion of each respective longitudinal edge, and the at least one illuminatable means including first and second illuminatable means received within and retained by the respective first and second channels.

3. A scooter as claimed in claim 1, wherein the at least one of first and second channels has a generally "C"-shaped cross-section.

4. A scooter as claimed in claim 1, wherein the at least one illuminatable means is releasably retained in the at least one of first and second channels.

5. A scooter as claimed in claim 1, wherein the platform is an extruded metal platform.

6. A scooter as claimed in claim 5, wherein the metal is substantially aluminium or an alloy thereof.

7. A scooter as claimed in claim 1, wherein the at least one illuminatable means comprises an illuminatable rod or tube.

8. A scooter as claimed in claim 7, wherein the illuminatable rod or tube is at least part transparent or translucent.

9. A scooter as claimed in claim 7, wherein the illuminatable rod or tube comprises a polymeric sheath enclosing or encapsulating a plurality of electrically connected illumination devices comprising light emitting diodes (LEDs).

10. A scooter as claimed in claim 7, wherein the illuminatable rod or tube is made substantially from polyvinylchloride (PVC).

11. A scooter as claimed in claim 8, wherein the illuminatable rod or tube comprises a hollow tube containing a plurality of illumination devices or a solid rod encapsulating the illumination devices.

12. A scooter as claimed in claim 1, wherein the scooter includes control means for the user to select a desired operation mode of the illuminatable means.

13. A scooter as claimed in claim 12, wherein the control means comprises switch means.

14. A scooter as claimed in claim 12, wherein the control means is programmed to operate the illuminatable means in at least one of an off mode, an on mode, a continuous mode, a flashing mode and a strobing mode.

15. A scooter as claimed in claim 1, wherein the illuminatable means is powered by one or more batteries.

16. A scooter as claimed in claim 1, wherein the scooter includes a power generator for powering the illuminatable means.

17. A scooter as claimed in claim 1, wherein the at least one illuminatable means is received within the at least one of first and second channels either from an end of the at least one of first and second channels or by snapping the at least one illuminatable means into the at least one of first and second channels.

18. A scooter as claimed in claim 1, wherein the scooter is a micro-scooter or collapsible micro-scooter.

19. A scooter as claimed in claim 1, wherein the at least one illuminatable means and the at least one of said first and second channels have a snap-fit connection.

20. A platform for supporting a user on a scooter, the platform having an upperside and an underside and comprising:
a footplate,
first and second longitudinal edges, first and second channels each associated with at least a portion of a respective longitudinal edge, at least one of first and second channels being configured to receive and entrap an illuminatable means, and
first and second walls depending from the underside of the platform away from the upperside of the platform so as to define a space between the walls, the first wall defining a void and the second wall defining a further void, each void having a length that is substantially equal to the length of the space, wherein the first wall comprises a first portion that extends from the underside of the platform and a second portion that extends at an angle between the first portion and the first channel and is spaced from the underside of the platform, wherein the second wall comprises a first portion that extends from the underside of the platform and a second portion that extends at an angle between the first portion of the second wall and the second channel and is spaced from the underside of the platform,
wherein the at least one illuminatable means comprises an elongate member providing a plurality of illumination devices therein, and the first and second channels comprises an elongate channel,
wherein a height or width of an inner portion of at least one first and second channels is greater than a height or width of an opening of the at least one of first and second channels, and a height or width of the at least one illuminatable means is greater than the height or width of the opening of the at least one of first and second channels, and
wherein the platform is a metal platform.

21. A platform as claimed in claim 20, wherein the platform is manufactured as a unitary component.

22. A platform as claimed in claim 20, wherein the platform is an extruded metal platform.

23. A platform as claimed in claim 22, wherein the metal is substantially aluminium or an alloy thereof.

24. A platform as claimed in claim 20, wherein said first and second channels are substantially parallel to one another.

25. A platform as claimed in claim 24, wherein the at least one of said first and second channels has a generally "C" cross-section.

26. A platform as claimed in claim 20, wherein the platform is a platform for a micro-scooter or collapsible micro-scooter.

27. A method of manufacturing a metal platform for a scooter, the platform having an upperside and an underside and comprising a footplate, first and second longitudinal edges, first and second channels each associated with at least a portion of a respective longitudinal edge, at least one of first and second channels being adapted to receive and entrap an illuminatable means, and first and second walls depending from the underside of the platform away from the upperside of the platform so as to define a space between the walls, the first wall defining a void and the second wall defining a further void, each void having a length that is substantially equal to the length of the space, wherein the first wall comprises a first portion that extends from the underside of the platform and a second portion that extends at an angle between the first portion and the first channel and is spaced from the underside of the platform, wherein the second wall comprises a first portion that extends from the underside of the platform and a second portion that extends at an angle between the first portion of the second wall and the second channel and is spaced from the underside of the platform, wherein the at least one illuminatable means comprises an elongate member providing a plurality of illumination devices therein, and the first and second channels comprises an elongate channel, and wherein a height or width of an inner portion of the at least one of first and second channels is greater than a height or width of an opening of the at least one of first and second channels, and a height or width of the at least one illuminatable means is greater than the height or width of the opening of the at least one of first and second channels, the method comprising the step of:

extruding the metal platform as a unitary component.

28. A method of manufacturing a platform for a scooter as claimed in claim 27, wherein the platform is extruded from metal substantially comprising aluminium or an alloy thereof.

29. A method of manufacturing a platform for a scooter as claimed in claim 27 further comprising snapping each illuminatable means into a corresponding channel to secure the illuminatable means to the channels.

* * * * *